United States Patent
Lai et al.

(10) Patent No.: US 6,288,740 B1
(45) Date of Patent: *Sep. 11, 2001

(54) METHOD AND APPARATUS FOR CONTINUOUS PRESENCE CONFERENCING WITH VOICE-ACTIVATED QUADRANT SELECTION

(75) Inventors: Jim Jiansu Lai, Lexington; Mark Alan Globerson, Framingham, both of MA (US)

(73) Assignee: Ezenia! Inc., Burlington, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,988

(22) Filed: Jun. 11, 1998

(51) Int. Cl.$^7$ .......................................... H04N 7/14

(52) U.S. Cl. ............................ 348/15; 348/16; 379/93.17

(58) Field of Search ................................. 348/14, 15, 16, 348/17, 588, 705, 153, 159; H04N 7/15

(56) References Cited

U.S. PATENT DOCUMENTS

| | | | |
|---|---|---|---|
| 5,382,972 | * 1/1995 | Kannes ..................................... | 348/16 |
| 5,481,297 | 1/1996 | Cash et al. .............................. | 348/13 |
| 5,600,646 | 2/1997 | Polomski ............................. | 370/263 |
| 5,684,527 | 11/1997 | Terui et al. ............................. | 348/15 |
| 5,710,591 | 1/1998 | Bruno et al. ............................ | 348/15 |
| 5,963,547 | 10/1999 | O'Neil et al. ......................... | 370/260 |

FOREIGN PATENT DOCUMENTS

WO 96/08911    3/1996    (WO) .

OTHER PUBLICATIONS

Multipoint Conferencing Unit (MCU), Lucent Technologies, 4 pages, 1997 (downloaded from Internet Website Mar. 16, 1998).

"Lucent Technologies Upgrades Multipoint Conferencing Unit with Next–Generation Capabilities and More Flexibility", Press Release, May 20, 1997.

Barnes, S., *Requirements Specification for an Multipoint Control unit (MCU) Intended for BT Teleconferencing Services*, BT\TECH\SPEC\001 Verision 1, Jun. 1995.

* cited by examiner

*Primary Examiner*—Paul Loomis
*Assistant Examiner*—Melur Ramakrishnaiah
(74) *Attorney, Agent, or Firm*—Hamilton Brook Smith & Reynolds, P.C.

(57) ABSTRACT

A method and apparatus for continuous presence conferencing is disclosed having voice-activated quadrant selection. A control processor in a multipoint control unit selects and assigns anchored sites to anchored regions of a composite video image. The control processor further selects a switched site according to a selection process and assigns the switched site to a switched region of the composite video image. The selection process for selecting the switched site includes evaluating audio signals received from the conference sites to determine a dominant audio signal and selecting the site associated with the dominant audio signal. A rotating site is selected and is assignable to any of the regions. A video processor processes the video signals according to the composite video image assignments to provide composite video signals for transmission to sites in the conference. The video signal of the switched site appears in the switched region of each composite video signal sent to the anchored sites and the rotating sites, the video signal of the rotating site appears in the switched region of the composite video signal sent to the switched site, and the video signal of the rotating site appears in the respective anchored region of the composite video signal sent to each anchored site.

16 Claims, 6 Drawing Sheets

METHOD AND APPARATUS FOR CONTINUOUS PRESENCE CONFERENCING WITH VOICE-ACTIVATED QUADRANT SELECTION

BACKGROUND OF THE INVENTION

Video conferencing systems allow for simultaneous exchange of audio, video and data information among multiple conferencing sites. Systems known as multipoint control units (MCUs) perform switching functions to allow three or more sites to intercommunicate in a conference. The MCU links multiple video conferencing sites together by receiving frames of digital signals from the sites, processing the received signals, and retransmitting the processed signals to appropriate sites. The digital signals include audio, video, data and control information. In a switched conference, the video signal from one of the conference sites, typically that of the loudest speaker, is broadcast to each of the participants. In a continuous presence conference, video signals from two or more sites are spatially mixed to form a composite video signal for viewing by conference participants.

In a typical continuous presence conference, the video display is divided into quadrants and up to five sites are selected at conference setup from the sites in the conference for display in the quadrants. Up to five combination organized into the four quadrants, are created statically and are fixed for the conference. Each combination is referred to as a video mix and each selected site views a video mix comprising the other four sites such that a selected site never receives its own video signal. One of the video mixes is also selected as a broadcast mix for viewing by those remaining sites in the conference that are not among the five selected sites.

In the typical continuous presence conference, no attempt is made to associate any particular site with a particular display quadrant. That is, the quadrant organization used does not provide for a site to appear in the same quadrant in each of the five video mixes. Since the five selected sites are chosen at conference setup, this selection remains static throughout the conference, unless a particular selected site leaves the conference, in which case one of the unselected sites may be selected as a replacement.

In another conference system, it is possible to display video information from an unselected site in a single video mix that is broadcast to all sites in the conference. However, since only one broadcast video mix is provided, each of the four sites in the broadcast mix sees its own video.

SUMMARY OF THE INVENTION

According to the present invention, a method and apparatus are provided for continuous presence conferencing having voice-activated quadrant selection. Accordingly, a multipoint control unit receives video signals from plural sites. Anchored sites are selected from the plural sites and assigned to respective anchored regions of a composite video image. A switched site is selected according to a selection process and assigned to a switched region of the composite video image. A rotating site is further selected from the plural sites and is assignable to any of the anchored and switched regions. The video signals are processed in the multipoint control unit according to the composite video image assignments to provide composite video signals for transmission to the plural sites.

According to an aspect of the invention, the selection process for selecting the switched site includes evaluating audio signals received from the conference sites to determine a dominant audio signal and selecting the site associated with the dominant audio signal. The switched site is selected at time intervals such that the particular site selected can differ depending on the dominant audio signal at the particular time interval.

The composite video signals include first composite video signals comprising video signals from each anchored site in their respective anchored regions and the video signal from the switched site in the switched region, except that the video signal from the rotating site takes the place of the anchored site intended to receive the particular first composite video signal. A second composite video signal comprises video signals from each anchored site in their respective anchored regions and the video signal from the switched site in the switched region. A third composite video signal comprises video signals from each anchored site in their respective anchored regions and the video signal from the rotating site in the switched region.

The respective first composite video signals are transmitted from the multipoint control unit to the associated anchored sites. The second composite video signal is transmitted to the rotating site and the third composite video signal is transmitted to the switched site. The remaining unselected sites in the conference receive the second composite video signal if the audio signal of the switched site is dominant relative to the audio signal of the rotating site, otherwise the third composite video signal is sent to these remaining sites.

From the perspective of the conference sites, the video signal of the switched site appears in the switched region of each composite video signal sent to the anchored sites and the rotating site, the video signal of the rotating site appears in the switched region of the composite video signal sent to the switched site, and the video signal of the rotating site appears in the respective anchored region of the composite video signal sent to each anchored site.

An apparatus of the invention comprises a multipoint control unit having a receiver for receiving video signals from the plural sites. A control processor selects anchored sites from the plural sites and assigns them to anchored regions of a composite video image. The control processor further selects a switched site according to a selection process and assigns the switched site to a switched region of the composite video image. A video processor processes the video signals according to the composite video image assignments to provide composite signals for transmission to the plural sites.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

A preferred video teleconferencing system capable of continuous presence conferencing is described in U.S. Pat. No. 5,600,646, the entire teachings of which are incorporated herein by reference. The system will now be described briefly herein followed by a description of the continuous presence configuration of the present invention.

Figure 1:
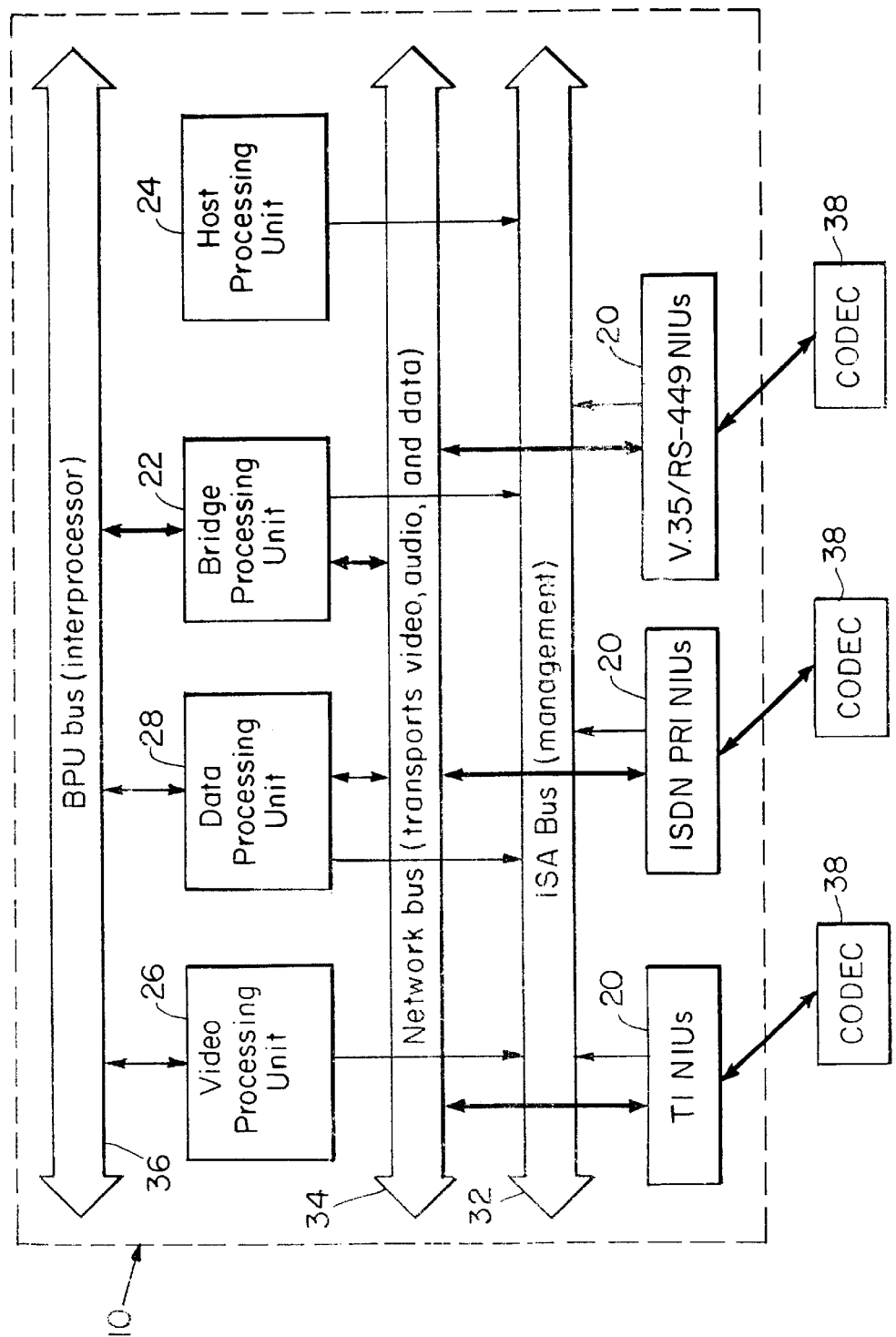
FIG. 1 is a block diagram of an MCU configuration.

FIG. 1 illustrates a multipoint control unit (MCU) 10 installed in a host personal computer. There are four major components in MCU 10: at least one network interface unit (NIU) 20, at least one bridge processing unit (BPU) 22, a host processing unit (HPU) 24, and at least one video processing unit (VPU) 26. In addition, MCU 10 supports an optional data processing unit (DPU) 28. In addition to a host Industry Standard Architecture (ISA) bus 32, the MCU 10 includes a network bus 34 and a BPU bus 36. The network bus 34 complies with the Multi-Vendor Integration Protocol (MVIP) while the BPU bus 36 is a derivative of the MVIP specification. External audiovisual terminals, or codecs 38, connect to the MCU 10 to form conferences. Throughout the specification, the term "site" is used to refer collectively to a location having an audiovisual terminal and a conference participant or user.

The MCU operation will now be described at a high-level with respect to FIG. 1. Each codec 38, typically an H.320 audiovisual terminal, connects to the MCU 10 through a communications network. Unsynchronized digital data frames from each codec 38 are made available on the network bus 34 through NIUs 20. The BPUs 22 process the unsynchronized data frames from the network bus 34 to produce data frames aligned on an octet boundary which are made available to other BPUs 22 on the BPU bus 36. The BPUs 22 also extract audio information from the data frames. The audio information is decoded to PCM data and made available on the BPU bus 36 for mixing with audio from other codecs 38 by respective BPUs 22 in a conference. The BPUs 22 combine compressed video information and mixed encoded audio information into frames which are placed on the network bus 34 for transmission to respective codecs 38. The optional DPU 28 performs processing functions similar to the BPUs 22 to support audiovisual terminals having T.120 enabled codecs.

In a conference, the BPUs 22 perform video switching within a conference by selecting video data frames from timeslots on the BPU bus 36 and routing the frames to respective codecs 38 in the conference. A particular BPU 22 selects the appropriate video data frames based upon an MCU conference selection process. Typically, the selection process is based upon a comparison of the voice levels of the conference sites. The loudest conference site is designated the current broadcaster to be viewed by all other conference locations while the current broadcaster typically views another site. In alternative conference selection processes, an MCU operator or a particular audiovisual terminal operating in a chair control mode selects a site as the current broadcaster.

In cases where the audiovisual terminals operate at different transmission rates or with different compression algorithms or are to be mixed into a composite image, the video data is further processed by the VPUs 26 before it returns through the BPUs. As discussed further below, the VPUs 26 extract compressed video information from the aligned data frames on the BPU bus 36. The compressed video information is decoded and placed on a pixel bus local to each VPU 26. The decoded video information on the pixel bus is made available for encoding in the VPU 26 for algorithm transcoding, spatial mixing, and transmission rate matching applications. The encoded video information is then placed on the BPU bus 36 for further processing by the BPUs 22 as in the typical conference arrangement.

The HPU 24 provides a management interface to a workstation for MCU operations. Through the HPU 24, an operator can control and manage the operation of the other components. The HPU 24 controls the setup and establishment of conferences, and performs monitoring and maintenance functions.

Each NIU 20 connects the MCU 10 with a particular communications network to a particular codec 38 through an appropriate interface port. The NIU 20 formats the digital data frames that pass between the MCU 10 and codecs 38 for transmission within the MCU 10 and across various communications networks. The frame structure for the data exchanged between the MCU 10 and the codecs 38 is defined in TSS Rec. H.221. Each NIU 20 reformats the digital data frames from the incoming line to an internal MCU format that is independent of the individual codec interfaces to the communications network. The reformatted data is then multiplexed onto the network bus 34 for transmission to the BPUs 22.

The MCU 10 shown in FIG. 1 implements video switching as time and space-division multiplexing. The BPUs 22 handle video switching within conferences by selecting and routing time and space-division multiplexed digital data. Each BPU 22 can support four codecs (audiovisual terminals) and multiple BPUs may be connected through the BPU bus 36. For each codec connection, the BPU 22 demultiplexes the digital data frames from the network bus 34, mixes the digital audio data, and multiplexes new digital data frames onto the network bus 34 from the mixed digital audio and the appropriate digital video and conferencing data.

The DPU 28 performs two functions: 1) protocol handling of T.120 stacks for multilayer protocol (MLP) conferencing applications and 2) protocol handling, video bridging and audio processing for PCS (Intel) codec applications. MLP is defined in the H-series Recommendations H.320/H.221 and will not be discussed further. Each DPU 28 can support four codecs (audiovisual terminals) and multiple DPUs can be connected through the BPU bus 36, similar to that used for BPUs 22.

Figure 2:
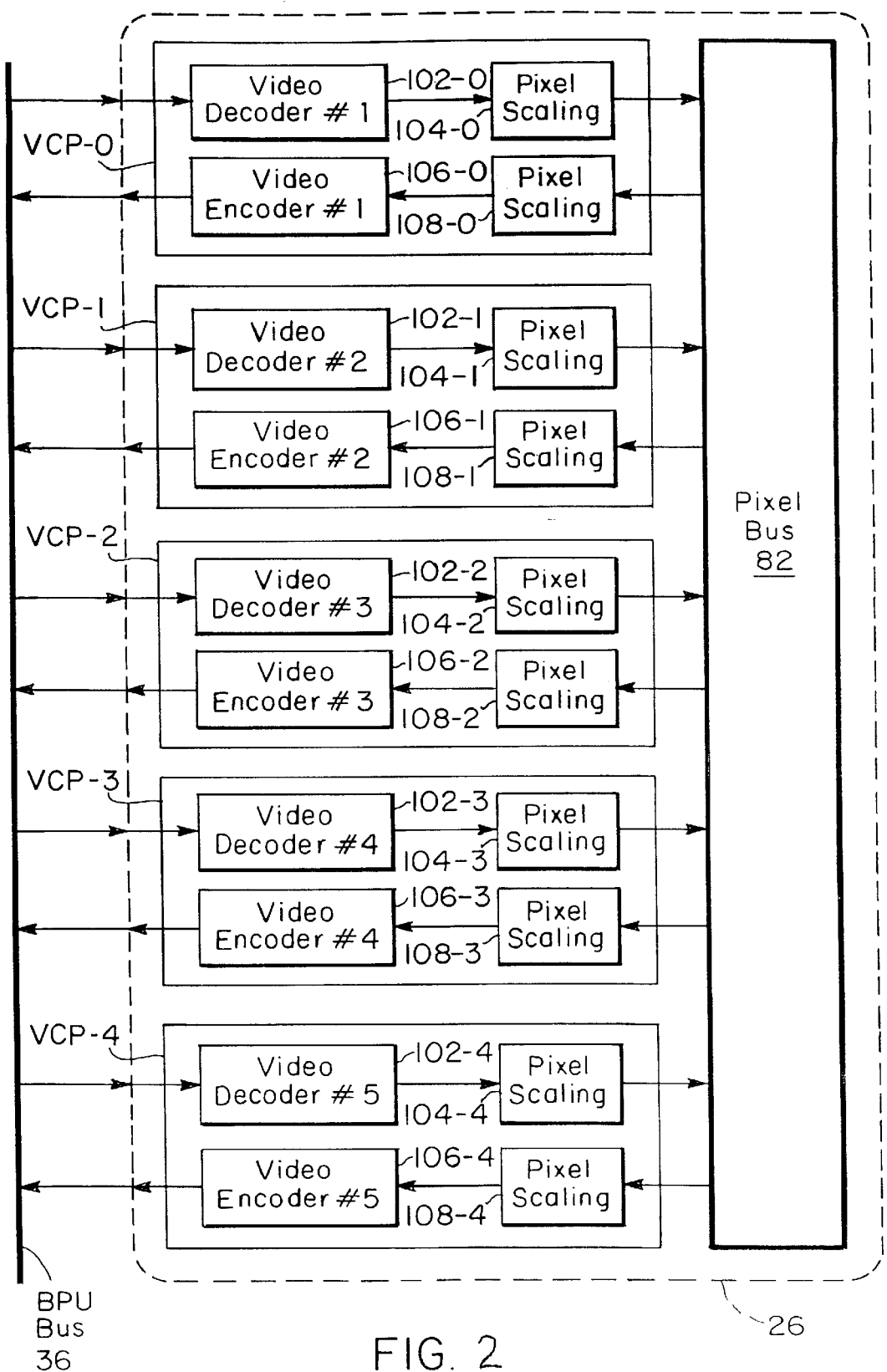
FIG. 2 is a schematic block diagram of an embodiment of a VPU.

Having described the components (BPU, DPU, NIU, HPU) of the MCU 10 which enable the basic conference bridging functions, a high level description of the flexibility provided by the VPU 26 will now be provided with reference to the functional block diagram of FIG. 2. In the MCU 10, compressed video information from up to five audiovisual terminals which are in the same conference are routed to a particular VPU 26 over the BPU bus 36. The VPU 26 comprises five video compression processors (VCP0–VCP4), each having a video decoder/encoder pair 102-i, 106-i, and pixel scaling blocks 104-i, 108-i.

A video decoder/encoder pair 102-i, 106-i is assigned to the compressed video information stream associated with each particular site in the conference. Each video decoder 102-i decodes the compressed video information using the algorithm that matches the encoding algorithm of its associated site. Included as part of the video decoder 102-i may be the processing to determine the framing, packets, and checksums which may be part of the transmission protocol. It should be noted that a processor encoded video stream can be assigned to multiple sites (e.g., a continuous presence application having more than five sites in the conference). In addition, a decoder/encoder pair 102-i, 106-i can switch among the sites within a conference.

The decoded video information, or pixels, are scaled up or down, if necessary, by a pixel scaling block 104-i to match the pixel resolution requirements of other sites in the conference that will be encoding the scaled pixels. For example, a desktop system may encode at a resolution of 256×240 while an H.320 terminal would require a pixel resolution of 352×288 for a Common Intermediate Format (CIF) image.

The scaled pixels are then made available to any other video encoder 106-j on a shared pixel bus 82. Each decoder 102-j outputs pixels onto the pixel bus 82 in a fixed timeslot, effectively creating a time division multiplexed bus. Each encoder 106-j may sample any of the images available on the pixel bus timeslots for re-encoding and/or spatial mixing or compositing. Another pixel scaling block 108-j is coupled between the pixel bus 82 and the encoder 106-j for adjusting the pixel resolution of the sampled image as needed.

Figure 3:
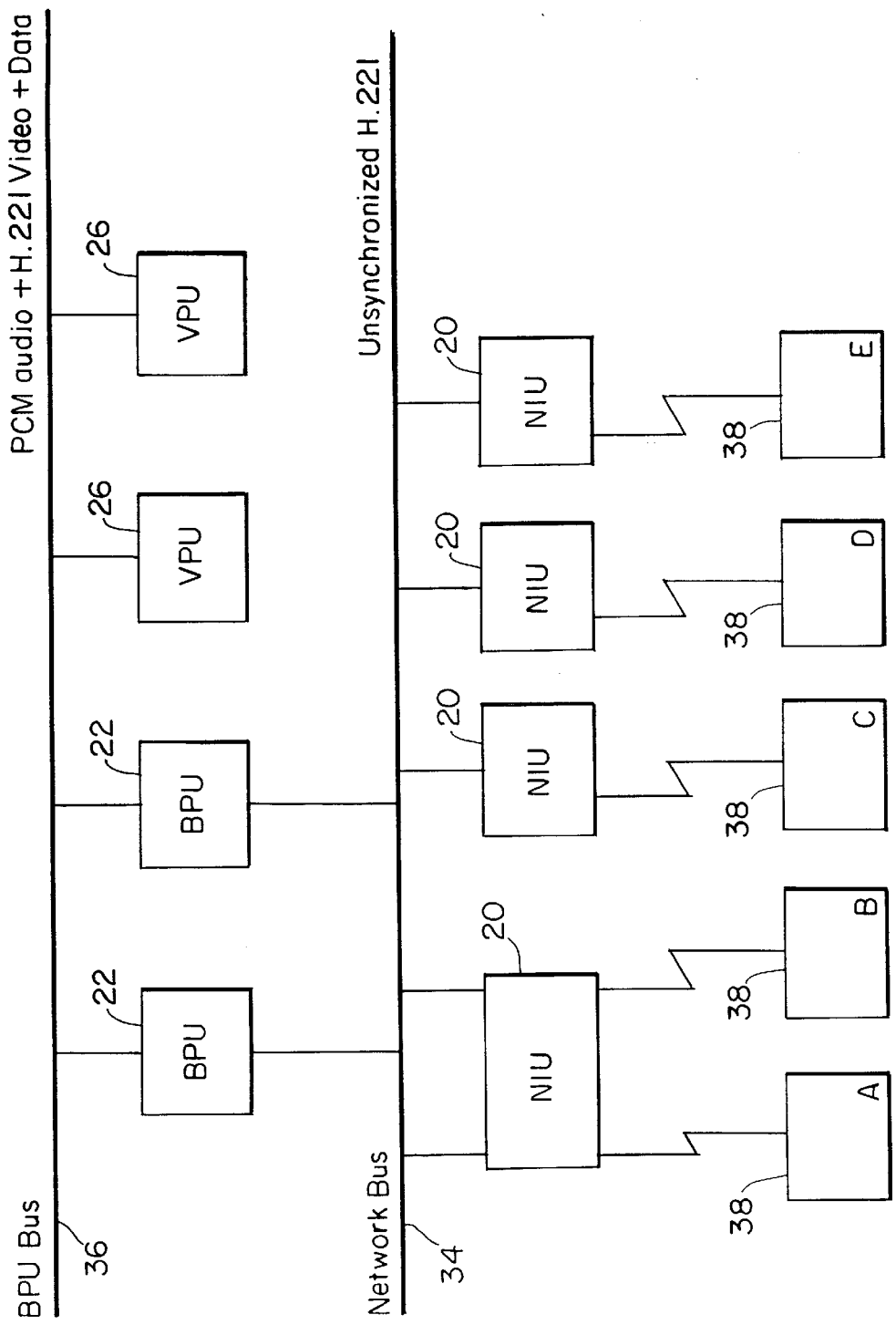
FIG. 3 is a block diagram of an MCU configuration illustrating the data flow for continuous presence conferencing.
Figure 4:
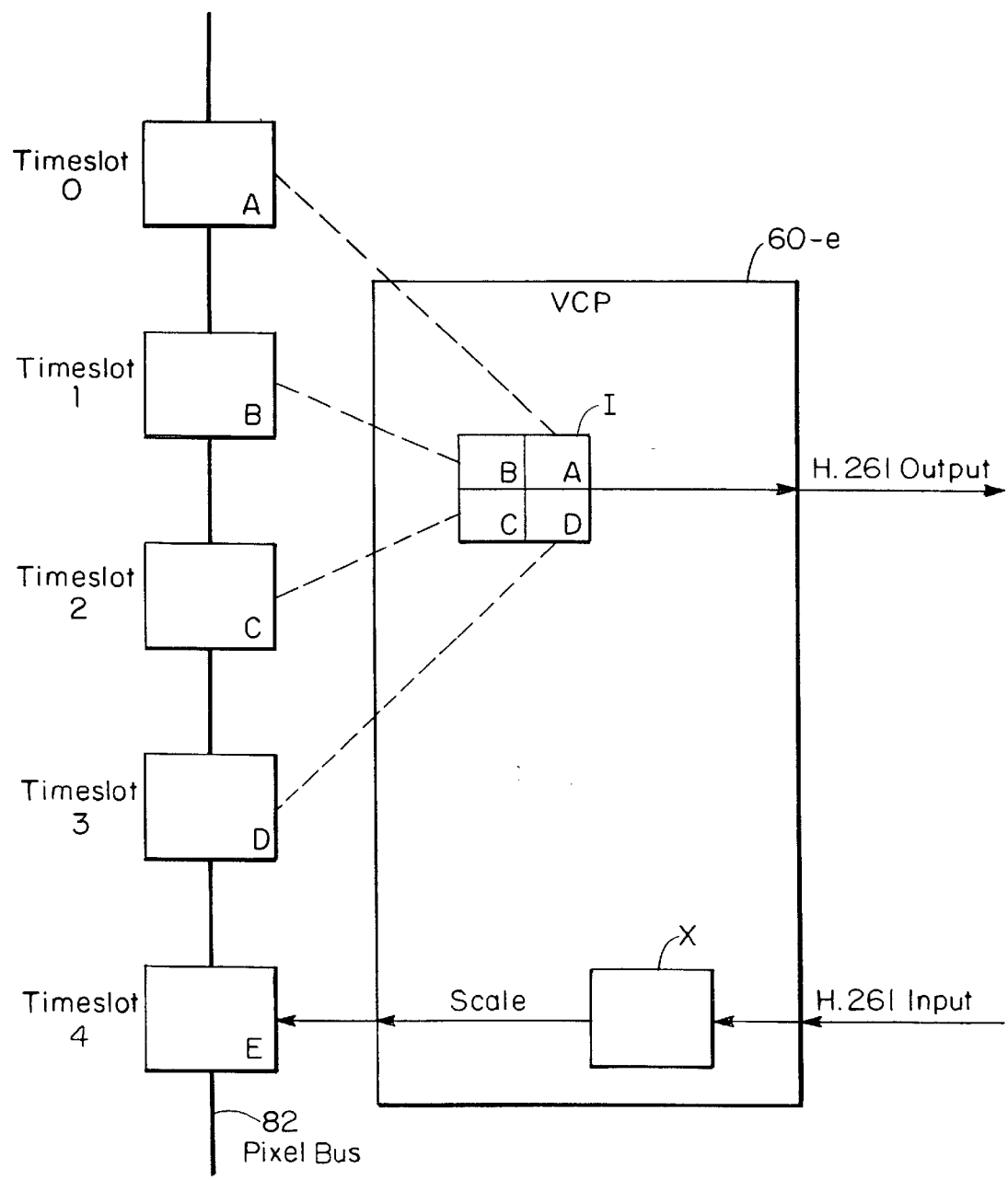
FIG. 4 is a block diagram illustrating image tiling in a continuous presence conference.

A continuous presence application is now described with reference to FIGS. 3 and 4. Note that the ISA bus 32 (FIG. 1) is not shown. In FIG. 3, data from sites 38 arrive over a communications network to respective NIUs 20. Five sites 38 (A, B, C, D, E) are connected in the conference. Sites A and B are shown connected to a particular NIU 20 which supports multiple codec connections (e.g., a T1 interface). The other sites C, D, and E connect to NIUs 20 supporting only a single codec connection (e.g., an ISDN interface). Each site 38 places one or more octets of digital data onto the network bus 34 as unsynchronized H.221 framed data. The BPUs 22 then determine the H.221 framing and octet alignment. This aligned data is made available to all other units on the BPU bus 36. The BPUs 22 also extract audio information from the H.221 frames and decode the audio into 16 bit PCM data. The decoded audio data is made available on the BPU bus 36 for mixing with audio data from other conference sites.

Aligned H.221 frames are received by the VPU 26 for processing by encoder/decoder elements called video compression processors (VCPs). The VPU 26 has five VCPs (FIG. 2) which in this example are respectively assigned to sites A, B, C, D, E. A VCP 60-e on the VPU 26 which is assigned to site E is functionally illustrated in FIG. 4. Compressed video information (H.261) is extracted from the H.221 frames and decoded by the VCP 60-e as image X. The decoder video image X is placed on the pixel bus 82 through a scaling block. FIG. 4 shows the pixel bus 82 with decoded video frames from each site A, B, C, D, E located in successive timeslots (0–4). The VCP 60-e assigned to site E receives the decoded video frames from sites A, B, C and D which are then tiled (spatially mixed) into a single composite image I. The tiled image I is then encoded as H.261 video within H.221 framing and placed on the BPU bus 36 (FIG. 3) for BPU processing as described above.

Having described a preferred video teleconferencing system capable of continuous presence conferencing, an improved continuous presence capability of the present invention will now be described which enables conference participants to view not only fixed video mix sites, but also a site selected on the basis of voice activity.

Figure 5:
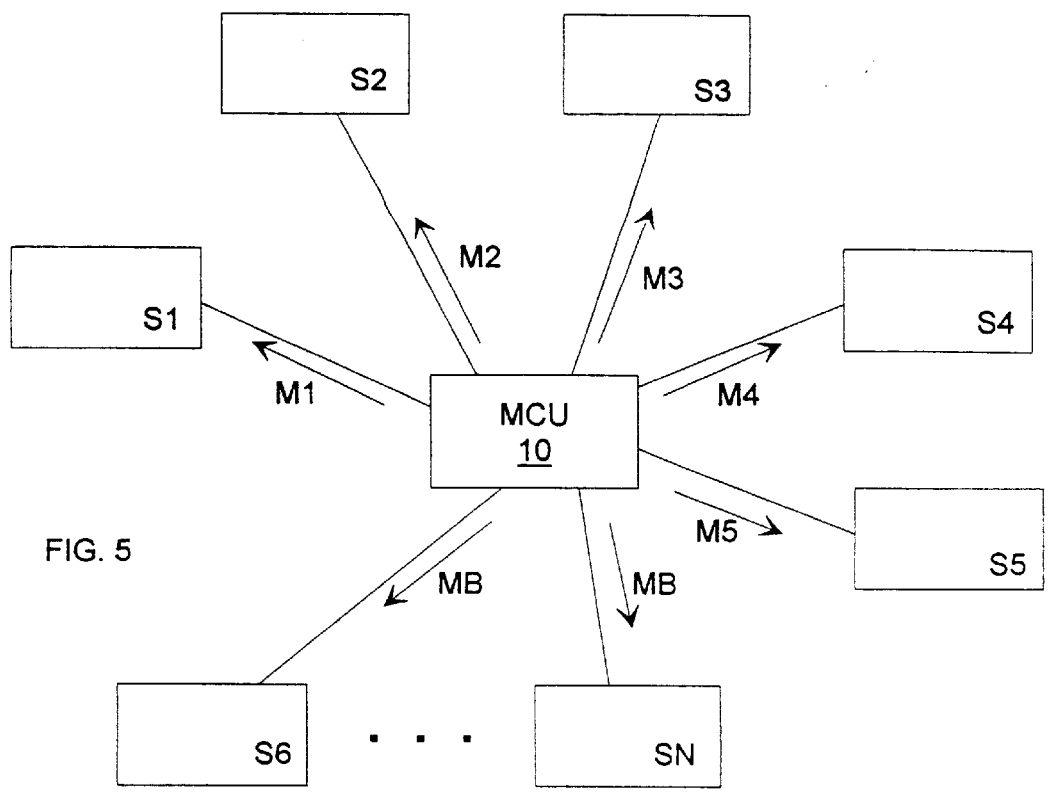
FIG. 5 is a block diagram of a fixed continuous presence conferencing arrangement.
Figure 6:
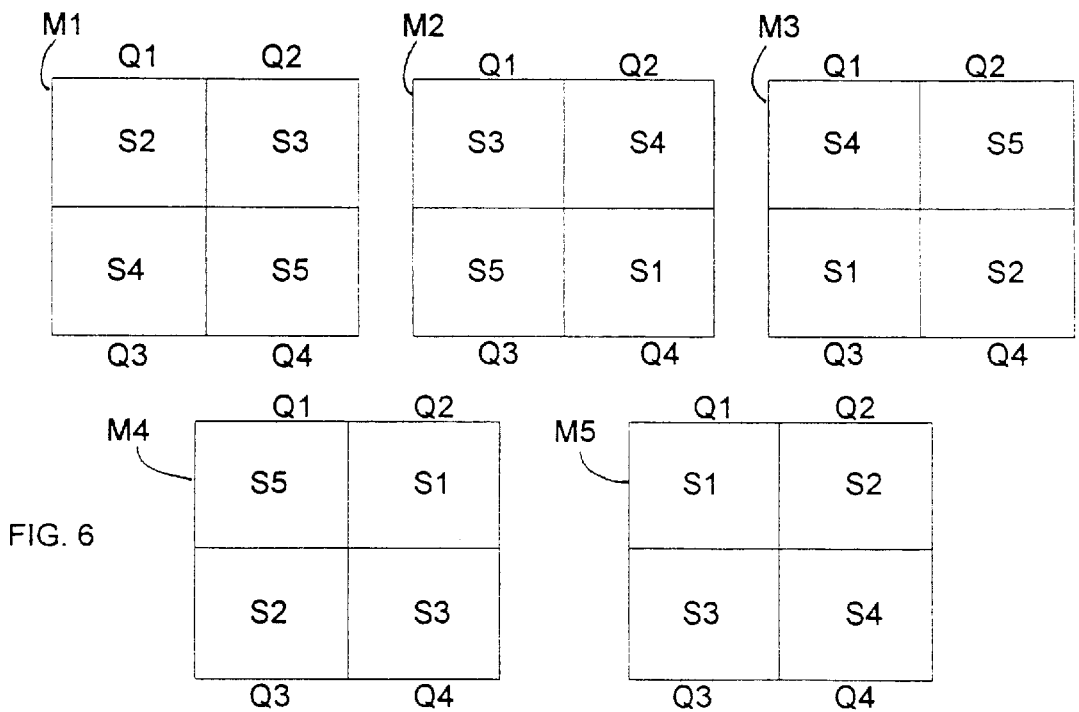
FIG. 6 is a diagram illustrating the fixed video mixes of the conferencing arrangement of FIG. 5.

In a typical continuous presence conference as shown in FIGS. 5 and 6, up to five sites (terminals) S1, S2, S3, S4, S5 are selected to be video sources for the conference either by conference definition or under director control. These site selections are fixed for the duration of the conference. The remaining sites (sites S6 to SN) which are in the conference are referred to as unselected sites since their video sources are not used in the conference whenever the conference is in continuous presence mode. Each selected site receives a video mix (M1, M2, M3, M4, M5) comprising up to four other selected sites displayed in corresponding quadrants Q1, Q2, Q3, Q4 of a video image wherein no site ever sees its own video. Thus, site S1 receives video mix M1, site S2 receives video mix M2, site S3 receives video mix M3, site S4 receives video mix M4, and site S5 receives video mix M5. In addition, each of the unselected sites S6 to SN receives a fixed broadcast video mix MB selected from among the video mixes M1 to M5. Note that the destination site for each video mix is fixed for the duration of the conference.

Referring to FIG. 6, it should be noted that the quadrant organization used in the typical continuous presence conference does not provide for the same site to appear in the same quadrant (Q1 to Q4) in each of the five video mixes M1 to M5. For example, site S3 appears in quadrant Q2 in mix M1 and the same site S3 appears in quadrant Q1 in mix M2. This is an important limitation that has been overcome with the voice-activated quadrant selection approach of the present invention.

Figure 7:
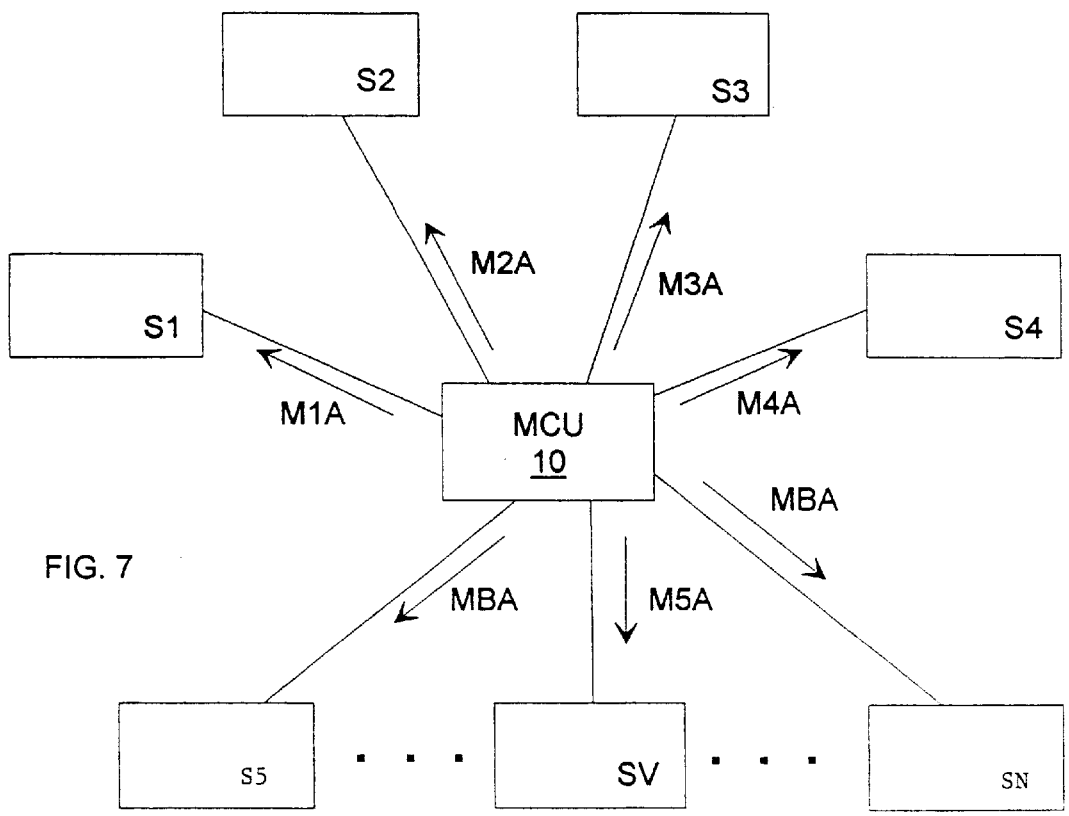
FIG. 7 is a block diagram of a continuous presence conferencing arrangement of the present invention.
Figure 8:
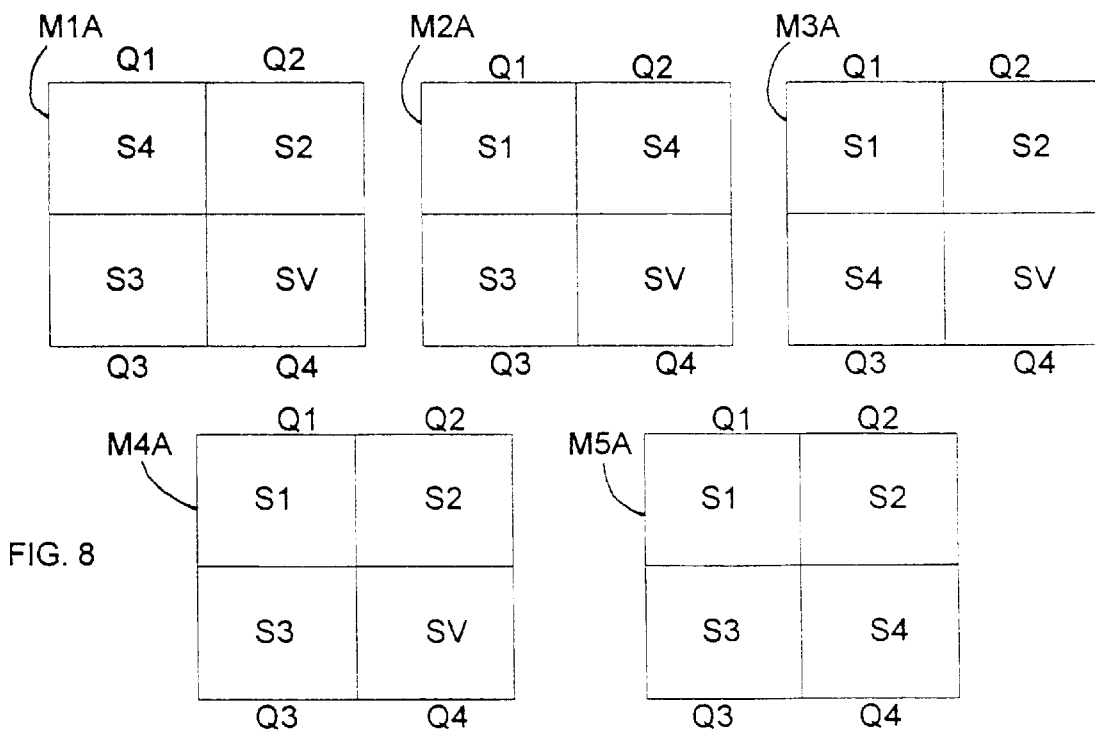
FIG. 8 is a diagram illustrating video mixes of the conferencing arrangement of FIG. 7.

In a voice-activated continuous presence conference of the present invention as shown in FIGS. 7 and 8, up to four sites S1, S2, S3, S4 are selected as sources for generating video mixes. Three of these selected sites S1, S2, S3 are assigned to a particular quadrant Q1, Q2, Q3 and are referred to as anchored sites. For example, site S1 always appears in quadrant Q1 in all mixes (M2A, M3A, M4A, M5A) in which it appears. Site S4 is assignable to any quadrant, taking the place of one of the sites S1, S2, S3 and is referred to as a rotating site. A fifth site is selected dynamically from the remaining conference sites (sites S5 to SN) as a video source based on a measurement of voice activity discussed further herein. This fifth site is referred to as the switched or voice-activated site SV and is assigned to the remaining quadrant Q4.

Each anchored site S1, S2, S3 receives a video mix (M1A, M2A, M3A) that comprises the rotating site S4 appearing in the quadrant assigned to the particular anchored site and the voice-activated site SV and the two other anchored sites appearing in their respective assigned quadrants. The rotating site S4 receives a video mix M4A that comprises the voice-activated site SV and the three anchored sites appearing in their respective assigned quadrants. The voice-activated site SV receives a video mix M5A comprising the rotating site S4 and the three anchored sites appearing in their respective assigned quadrants. Thus, site S1 receives video mix M1A, site S2 receives video mix M2A, site S3 receives video mix M3A, site S4 receives video mix M4A, and site SV receives video mix M5A. In addition, each of the unselected sites S5 to SN receives a broadcast video mix MBA selected from video mixes M4A and M5A depending on which site, SV or S4, is the dominant speaker as described further herein.

It should be noted that FIG. 8 shows only one particular quadrant arrangement and that any of the quadrants Q1 to Q4 can be selected for assignment to the voice-activated site SV. For example, if quadrant Q1 is instead selected for the voice-activated site SV, then quadrants Q2, Q3, and Q4 are assigned to sites S1, S2, and S3.

As another example, site S1 can be treated as the rotating site and site S4 as an anchored site. In addition, each of the unselected sites S5 to SN receives a broadcast video mix MBA selected from video mixes M1A and M5A depending on whether site SV or S1 is the dominant speaker. Because of the construction of the five video mixes in FIG. 8, selecting a different voice-activated quadrant between quadrant Q1 and Q4 is simply a matter of selecting the broadcast mix MBA from between mix M1A and mix M4A in addition to mix M5A.

The method of voice-activated site selection is now described. The audio signal from each conference site is evaluated periodically to determine if a conference user is speaking. A number of techniques exist to accomplish this. Typical methods that have reasonable computational burdens use energy measurement and/or frequency evaluation. The result is a simple boolean value indicating if the user is speaking or quiet. There is usually some hysteresis in these measurements so that a speaker can pause briefly and then resume speaking without the boolean value indicating that the user has stopped speaking. This is called hang time and can be accounted for with a programmable system variable. For voice-activated switching, this boolean value preferably is checked only for the rotating site S4 and the sites S5 to SN. These boolean values are evaluated to select a dominant speaker. The video of the dominant speaker is then assigned to be displayed in the voice-activated quadrant.

To be chosen as a dominant speaker, the boolean value for a site must indicate that the user is speaking. If no other user is already selected as the dominant speaker, then this site is chosen as the dominant speaker. If another user was selected as the dominant speaker but that user is no longer speaking, then the dominant speaker is replaced with the new user. If the dominant speaker leaves the conference, then any user that is currently speaking is selected as the new dominant speaker.

There are several variations on selecting the dominant speaker. Instead of determining a boolean value, the loudness level of all users can be calculated. Other variations include keeping track of which user has been speaking for the longest time so that this user is selected when the dominant speaker stops speaking.

In all cases, it is the selection of one user that is determined by some audio criteria to be the most important user to be seen. The video signal for this newly selected speaker is then seen by the other conference participants in the quadrant Q4 assigned to the voice-activated site SV.

Changing dominant speakers means changing video mixes and this can be somewhat disruptive if it is done too frequently. To prevent the dominant speaker from changing too frequently, preferably a reasonable amount of time must pass between the selection of dominant speakers. This is typically a fixed period of time that can be set as a conference parameter. Alternatively, the period can be made to adapt to the conference dynamics.

Any site among the unselected sites S5 to SN can appear in the voice-activated quadrant by becoming the dominant speaker. This provides an opportunity for each site in the conference, not just the selected video mix sites, to be seen by the other sites. With voice-activated site selection, the destination site for certain video mixes is no longer fixed. That is, since the voice-activated site is selected dynamically, the destination site for video mix M5A can change.

The present invention provides several advantages for conferences having more than five sites. When the mix of video sources changes due to voice activity, only a single quadrant is changed at a time and the remaining sites stay in the same quadrant. Further, any user can be chosen as the dominant audio source and be seen by all participants in the conference.

Referring again to FIGS. 7 and 8, the dynamic selection of the broadcast mix is now described. Initially, video mix M5A is selected as the broadcast mix MBA sent to sites S5 to SN. If a site SK from among unselected sites S5 to SN becomes the dominant speaker, then mix M4A is sent to sites S5 to SN as the broadcast mix MBA, excluding site SK, with the voice-activated site SV in the mix set to site SK. Sites S5 to SN, excluding site SK, see a brief whole screen freeze as the switch occurs from mix M5A to mix M4A. Note that the new mix appears as a single quadrant change in quadrant Q4, the source changing from site S4 to site SK. Sites S1 to S4 receive their respective mixes M1A, M2A, M3A, M4A with only a single quadrant change in quadrant Q4, the source changing from site SV to site SK. Meanwhile, site SK continues to receive mix M5A.

Next, consider that another site, site SL, among the unselected sites S5 to SN, becomes the dominant speaker and replaces site SK as the voice-activated site SV. The video mix that is sent to site SL is switched from mix M4A to mix M5A. The video mix that is sent to site SK is switched from mix M5A to mix M4A with a brief whole screen freeze as the switch occurs. The other unselected sites continue to receive mix M4A and only notice a single quadrant change in quadrant Q4, the source changing from site SK to site SL with a brief quadrant screen freeze only during the switch. Sites S1 to S4 receive their respective mixes M1A, M2A, M3A, M4A with only a single quadrant change in quadrant Q4, the source changing from site SK to site SL.

If rotating site S4 becomes the dominant speaker, then the following changes occur. Site SL continues to receive mix M5A with no changes and with site S4 in the voice-activated quadrant Q4. The video mix that is sent to the other unselected sites is switched from mix M4A to mix M5A with a whole screen freeze followed by a single quadrant change in quadrant Q4, the source changing from site SL to site S4. Sites S1 to S4 receive their respective mixes M1A, M2A, M3A, M4A with no quadrant change in quadrant Q4.

If one of the unselected sites S5 to SN again becomes the dominant speaker, then the logic described above is followed.

There are three types of video mix switching described above that occur within the MCU 10:

1. Switch from mix M4A to mix M5A. Anytime this switch is necessary, a freeze command is sent to the codecs currently receiving mix M4A, a switch is made on the BPU bus, and a fast update command is sent to the VCP encoder 106-i (FIG. 2) which generates mix M5A.
2. Switch/replace the voice-activated site SV in mixes M1A, M2A, M3A, M4A. Consider again the example above wherein site SL replaces site SK in the voice-activated quadrant. First, a freeze (or blank) command is sent to the VCP decoder 102-i (FIG. 2) that is currently decoding site SK, a switch is made on the BPU bus, a fast update command is sent to site SL, and then an un-freeze (or un-blank) command is sent to the VCP decoder which is now decoding site SL.
3. Switch from mix M5A to mix M4A with new site SL replacing site SK in the voice-activated quadrant. First a freeze command is sent to the codecs receiving mix M5A, a switch is made on BPU bus, a fast update command is sent to site SL, and after a delay, another fast update command is sent to the VCP encoder 106-i (FIG. 2) which generates mix M4A. The delay is needed to ensure that the display remains frozen until site SK is removed from mix M4A and replaced by site SL and that site SL is being decoded by another VCP decoder.

Without the proper delay, site SK could see itself briefly before viewing new site SL. The proper delay value can be obtained by receiving a message from the particular VCP decoder 102-i (FIG. 2) that was decoding site SK and is currently decoding site SL when it has finished the decoding of the first picture of site SL.

It should be noted that the specific embodiment of five video mixes of four sources displayed in four quadrants can be generalized to N mixes of N-1 shown in N-1 display sections. That is, each site views a display with N-1 video images. Again, none of the sites sees its own video. N-2 sites are permanently selected as video sources and are assigned to appear in specific sections of the display. Another site is permanently selected as a video source that appears once in each of the N-1 sections. This is the rotating site. In addition, one of the N-1 sections is selected as a voice-activated region for displaying a dominant speaker.

Each of the N-2 video mix sites sees the other permanent video mix sites, the rotating site and a site selected on the basis of voice activity. The rotating site receives a video mix comprising the N-2 mix sites and the voice-activated site in their respective assigned regions. All remaining unselected conference sites receive a video mix consisting of the N-2 video mix sites in their assigned sections and the site selected as the dominant speaker in the voice-activated region. The dominant speaker is either the rotating site or one of the unselected sources chosen as a video source based on voice activity.

In another embodiment of voice activated switching, the rotating quadrant is not used. In this method, a voice activated conference is schedule with three sites assigned in the upper left, upper right, and lower left quadrant. There is no user designated for the rotating quadrant position. The voice activated quadrant is assigned to the lower right quadrant.

With this method, any or all of the four quadrants can be selected by voice activity instead of being limited to only one quadrant. However, since sites will view one blank quadrant all of the time, this quadrant can be filled with a logo or other bit-mapped graphic image. This approach can be extended to support more voice-activated sites while still preserving only a single quadrant change when a single video switch occurs.

An advantage of this method over having five sites in the video mix is that all sites in the conference see all users in the mix, without seeing their own video. For example, if sites 1,2,3 and voice-activated site 6 are in the mix then sites 1,2,3,6 are seen by all unselected sites and all selected sites see all of the other selected sites (except their own video). This is done by properly selecting the video mixes for each site.

EQUIVALENTS

While this invention has been particularly shown and described with reference to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of conferencing in a multipoint control unit, the method comprising the steps of:
    connecting plural sites to the multipoint control unit and receiving video signals at the multipoint control unit from each site;
    selecting and assigning anchored sites to anchored regions of a composite video image;
    selecting a switched site according to a selection process and assigning the switched site to a switched region of the composite video image;
    processing the video signals in the multipoint control unit according to the composite video image assignments to provide composite video signals for transmission to the plural sites; and
    selecting a rotating site assignable to any of said regions and wherein the video signal of the switched site appears in the switched region of each composite video signal sent to the anchored sites and the rotating site, the video signal of the rotating site appears in the switched region of the composite video signal sent to the switched site, and the video signal of the rotating site appears in the respective anchored region of the composite video signal sent to each anchored site.

2. A method of conferencing in a multipoint control unit, the method comprising the steps of:
    connecting plural sites to the multipoint control unit and receiving video signals and audio signals at the multipoint control unit from each site;
    selecting and assigning anchored sites to anchored regions of a composite video image;
    selecting a switched site according to a selection process comprising evaluating the audio signals from among those sites other than the anchored sites to determine a dominant audio signal and selecting the site associated with the dominant audio signal;
    assigning the switched site to a switched region of the composite video image; and
    processing the video signals in the multipoint control unit according to the composite video image assignments to provide composite video signals for transmission to the plural sites.

3. The method of claim 2 wherein the step of evaluating the audio signals includes measuring loudness of the signals.

4. The method of claim 2 wherein the step of evaluating the audio signals includes measuring signal frequencies.

5. The method of claim 2 wherein the selection process includes selecting the switched site at time intervals.

6. A method of conferencing in a multipoint control unit, the method comprising the steps of:
    connecting plural sites to the multipoint control unit and receiving video signals at the multipoint control unit from each site;
    selecting and assigning anchored sites to anchored regions of a composite video image;
    selecting a switched site according to a selection process and assigning the switched site to a switched region of the composite video image; and
    processing the video signals in the multipoint control unit according to the composite video image assignments to provide composite video signals for transmission to the plural sites;

selecting a rotating site assignable to any of said regions and wherein the composite signals include:
first composite video signals comprising video signals from each anchored site in their respective anchored regions, except that the video signal from the rotating site takes the place of the anchored site intended to receive the particular first composite video signal, and the video signal from the switched site in the switched region;
a second composite video signal comprising video signals from each anchored site in their respective anchored regions and the video signal from the switched site in the switched region; and
a third composite video signal comprising video signals from each anchored site in their respective anchored regions and the video signal from the rotating site in the switched region.

7. The method of claim 6 further comprising the steps of transmitting the first composite video signals to the respective anchored sites, transmitting the second composite video signal to the rotating site, and transmitting the third composite video signal to the switched site.

8. The method of claim 7 wherein each site transmits audio signals to the multipoint control unit and the step of selecting the switched site according to a selection process comprises evaluating the audio signals from among those sites other than the anchored and rotating sites to determine a dominant audio signal and selecting the site associated with the dominant audio signal.

9. The method of claim 8 further comprising the step of transmitting the second composite video signal to those sites other than the anchored, switched and rotating sites if the audio signal of the switched site is dominant relative to the audio signal of the rotating site, otherwise transmitting the third composite video signal to said sites.

10. A multipoint control unit for conferencing plural sites, the multipoint control unit comprising:
a receiver for receiving video signals from the plural sites;
a control processor for selecting and assigning anchored sites to anchored regions of a composite video image; selecting a switched site according to a selection process and assigning the switched site to a switched region of the composite video image; selecting a rotating site assignable to any of the regions; and
a video processor for processing the video signals according to the composite video image assignments to provide composite video signals for transmission to the plural sites;
wherein the video signal of the switched site appears in the switched region of each composite video signal sent to the anchored sites and the rotating site, the video signal of the rotating site appears in the switched region of the composite video signal sent to the switched site, and the video signal of the rotating site appears in the respective anchored region of the composite video signal sent to each anchored site.

11. A multipoint control unit for conferencing plural sites, the multipoint control unit comprising:
a receiver for receiving video signals from the plural sites;
a control processor for selecting and assigning anchored sites to anchored regions of a composite video image; selecting a switched site according to a selection process and assigning the switched site to a switched region of the composite video image; selecting a rotating site assignable to any of the regions; and
a video processor for processing the video signals according to the composite video image assignments to provide composite video signals for transmission to the plural sites;
wherein the receiver further receives audio signals from the plural sites and wherein the selection process for selecting the switched site comprises the control processor evaluating the audio signals from among those sites other than the anchored and rotating sites to determine a dominant audio signal and selecting the site associated with the dominant audio signal.

12. The multipoint control unit of claim 11 wherein the control processor evaluates the audio signals by measuring loudness of the signals.

13. The multipoint control unit of claim 11 wherein the control processor evaluates the audio signals by measuring signal frequencies.

14. A multipoint control unit for conferencing plural sites, the multipoint control unit comprising:
a receiver for receiving video signals from the plural sites;
a control processor for selecting and assigning anchored sites to anchored regions of a composite video image; selecting a switched site according to a selection process and assigning the switched site to a switched region of the composite video image; selecting a rotating site assignable to any of the regions; and
a video processor for processing the video signals according to the composite video image assignments to provide composite video signals for transmission to the plural sites;
wherein the composite signals include:
first composite video signals comprising video signals from each anchored site in their respective anchored regions, except that the video signal from the rotating site takes the place of the anchored site intended to receive the particular first composite video signal, and the video signal from the switched site in the switched region;
a second composite video signal comprising video signals from each anchored site in their respective anchored regions and the video signal from the switched site in the switched region; and
a third composite video signal comprising video signals from each anchored site in their respective anchored regions and the video signal from the rotating site in the switched region.

15. A method of conferencing in a multipoint control unit, the method comprising the steps of:
connecting plural sites to the multipoint control unit and receiving video signals and audio signals at the multipoint control unit from each site;
selecting first, second and third sites from said plural sites and assigning said selected sites to first, second and third quadrants, respectively, of a composite video image;
selecting a fourth site from said plural sites according to a selection process comprising evaluating the audio signals from among those sites other than the first, second and third sites to determine a dominant audio signal and selecting the site associated with the dominant audio signal;
assigning said fourth site to a fourth quadrant of the composite video image; and
processing the video signals in the multipoint control unit according to the composite video image assignments to provide composite video signals for transmission to the plural sites.

16. A method of conferencing in a multipoint control unit, the method comprising the steps of:
connecting plural sites to the multipoint control unit and receiving video signals at the multipoint control unit from each site;

selecting first, second and third sites from said plural sites and assigning said selected sites to first, second and third quadrants, respectively, of a composite video image;

selecting a fourth site from said plural sites according to a selection process and assigning said fourth site to a fourth quadrant of the composite video image;

selecting a fifth site assignable to any of said quadrants, and processing the video signals in the multipoint control unit according to the composite video image assignments to provide composite video signals for transmission to the plural sites;

and wherein the video signal of the fourth site appears in the fourth quadrant of each composite video signal sent to the first, second, third and fifth sites, the video signal of the fifth site appears in the fourth quadrant of the composite video signal sent to the fourth site, and the video signal of the fifth site appears in the respectively assigned quadrant of the composite video signal sent to the first, second and third sites.

* * * * *